United States Patent [19]

Niccolls

[11] 4,339,847
[45] Jul. 20, 1982

[54] DRESSED FOWL LEG HOLD-DOWN MEANS

[76] Inventor: Paul L. Niccolls, 3631 N. Dawn Ct., Springfield, Mo. 65803

[21] Appl. No.: 187,176

[22] Filed: Sep. 15, 1980

[51] Int. Cl.³ ............................................. A22C 21/00
[52] U.S. Cl. ........................................ 17/1 S; 17/11; 17/44.1
[58] Field of Search ................... 17/11, 1 S, 44.1, 44

[56] References Cited
U.S. PATENT DOCUMENTS

| | | | |
|---|---|---|---|
| 1,123,019 | 12/1914 | Selden | 17/1 S |
| 2,557,890 | 6/1951 | Perry | 17/1 S |
| 3,213,487 | 10/1965 | Reynolds | 17/11 |

*Primary Examiner*—Willie G. Abercrombie

[57] ABSTRACT

A V-shaped wire bail has first and second leg hooks engageable with the legs of a dressed fowl and a circular wire loop at its apex fitable over an elongated plastic tubular bail anchor extending upwardly through the back of the fowl with canted tab means engaging the loop to retain the bail means so as to hold the bail and the fowl legs in the body cavity. Apparatus for positioning the bail against the legs includes clamp cylinders for moving pusher plates against the legs to position the legs and a carrier cylinder for moving an individual bail member downwardly to hook the leg hooks over the legs with a punch cylinder being activated to punch an aperture through the back of the fowl adjacent the spinal column following which a cylinder below the fowl is actuated to insert the anchor means in retaining position with respect to the fowl and the bail.

18 Claims, 13 Drawing Figures

Fig-11

DRESSED FOWL LEG HOLD-DOWN MEANS

BACKGROUND OF THE INVENTION

The present invention is in the field of poultry processing and is more particularly directed to a new and unique leg tie-down means and apparatus for affixing same to a dressed fowl.

It is desirable that a dressed fowl such as a turkey or the like have the ends of its legs tucked into the body cavity so as to save space and present a uniform appearance.

The positioning of the fowl legs in the abdominal cavity was initially achieved by manual manipulations which are time-consuming and labor expensive and which do not always provide a satisfactory result in that the legs frequently will not be retained in their desired position. A number of mechanical contrivances have been proposed for alleviating the foregoing problem with one of the most popular of such contrivances being a wire member for clamping the leg ends together. Unfortunately, such devices are difficult to attach and also difficult to remove to the consequent inconvenience and added cost to the user.

Therefore, it is a primary object of this invention to provide a new and improved poultry leg tie-down means for positioning the leg ends within the body cavity and securely maintaining same therein.

A further object of the invention is the provision of a new and improved apparatus for automatically attaching leg tie-down and restraining means to a dressed fowl.

SUMMARY OF THE INVENTION

Achievement of the foregoing objects is enabled by the preferred embodiments of the invention which are directed to the tie-down means per se as well as apparatus for effecting connection of same to fowl. More specifically, the leg tie-down means comprises a V-shaped wire bail having first and second leg engaging hooks at each upper end of the "V" and having a circular closed loop at the apex of the V. Bail anchor means in the form of an elongated hollow plastic rod is inserted through the back of the fowl up into the abdominal cavity with canted locking tabs at one end of the anchor means moving through the closed loop of the wire bail and snapping outwardly into position to preclude removal of the anchor means from the bail. The opposite end of the anchor means includes a radial flange which engages the back of the bird to limit the extent of inward movement of the anchor means so that the anchor means consequently holds the bail in connection with the leg ends to retain the legs in their tucked position until such time as the anchor means is separated from the wire bail or is simply cut to sever it and permit the wire bail and legs to move upwardly and outwardly of the cavity. The wire bail is then simply lifted from the legs by the ultimate user without any need for difficult manual manipulation.

Apparatus for applying the leg securing and anchoring means is mounted on a table top which includes a cradle in which a dressed fowl is positioned on its back with its abdominal cavity facing upwardly. First and second clamp cylinders are positioned on the framework above the table with the rods ends of such cylinders pivotally supporting first and second leg engaging and positioning plates. When the clamping cylinders are actuated by compressed air they are extended to move the leg engaging plates there only to contact the legs of the fowl and move same downwardly and inwardly into the body cavity where they are then held by the extended cylinders and associated plates.

A second cylinder is then actuated to move a bail carrier on which a leg holding and restraining bail is positioned downwardly so that leg hooks of the bail engage the leg ends of the fowl. Additionally, a punch cylinder is also moved downwardly with the bail and is then actuated to punch through the back of the fowl. The punch is then retracted and a cylinder positioned below the table is actuated to extend the cylinder outwardly to carry an elongated plastic anchor member outwardly through the portion of the fowl's back which has just previously been punched by the punch member.

The anchor means has tabs on its upper end which extend through a circular loop in the bail and then pop outwardly to prevent retraction of the anchor means from the wire loop. The wire bail is consequently held in position and itself serves to hold the legs in position. The carrier cylinder is then contracted and the clamp cylinders are also contracted to complete the cycle and permit removal of the fowl from the cradle.

DESCRIPTION OF THE PREFERRED EMBODIMENT

Figure 1:
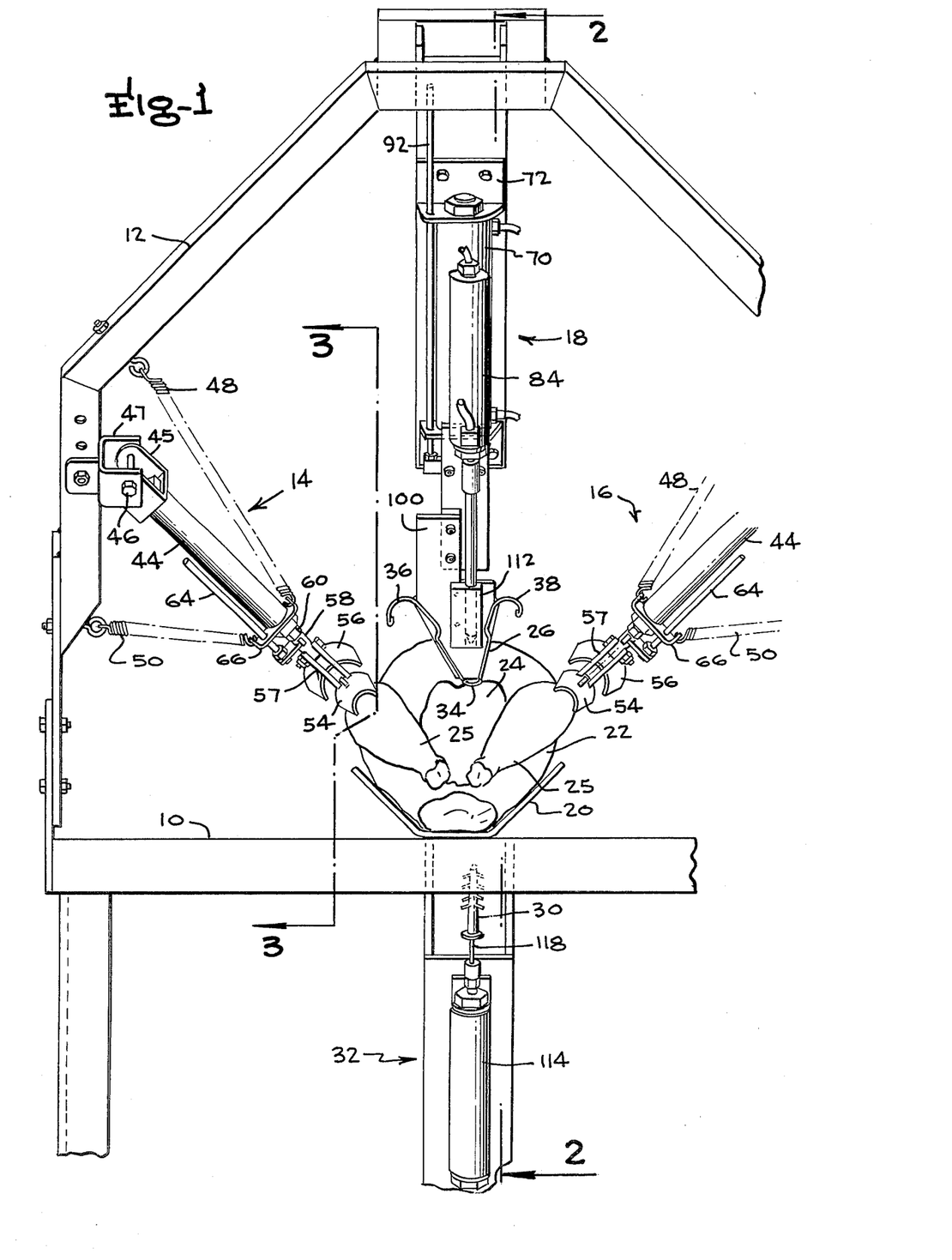
FIG. 1 is a front elevation view of the preferred embodiment of the invention shown in conjunction with a dressed fowl with the parts in a ready position prior to actuation.

Attention is initially invited to FIG. 1 of the drawings which illustrate the preferred embodiment which includes a table 10 above which a supporting framework 12 extends for providing support for first and second leg positioning means 14 and 16 and a central multi-function unit 18. A cradle 20 on table 10 provides support for an upwardly facing dressed fowl 22 having an open body cavity 24 and legs 25. The multi-function unit 18 performs the functions of positioning a leg holding and restraining bail 26 in contact with the legs 25 of the fowl 22 and then punching a receiving opening through the back of the fowl for permitting the insertion of a bail anchor means 30 into the fowl by anchor inserting means 32 positioned below table 10.

Figure 6:
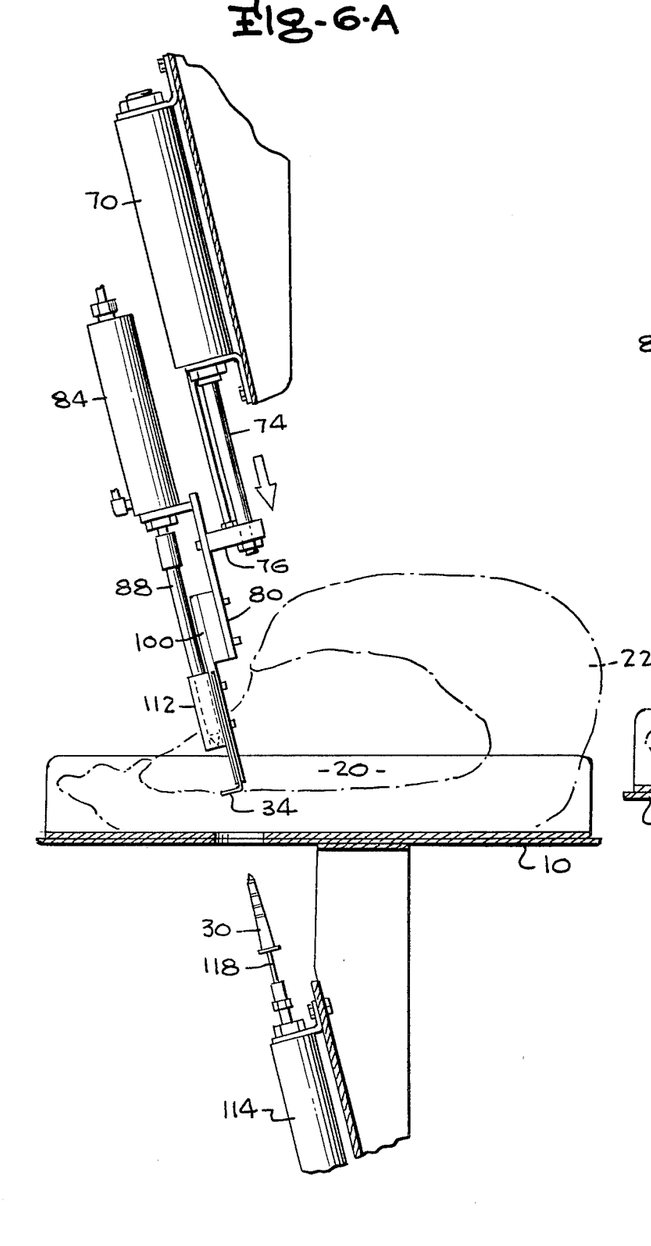
FIG. 6A is a side elevation view illustrating a first step in the actuation of the apparatus.
FIG. 6B is a side elevation view illustrating a second step in the actuation of the apparatus.
FIG. 6C is a side elevation illustrating a third step in the actuation of the apparatus.
Figures 6, 7, 10:
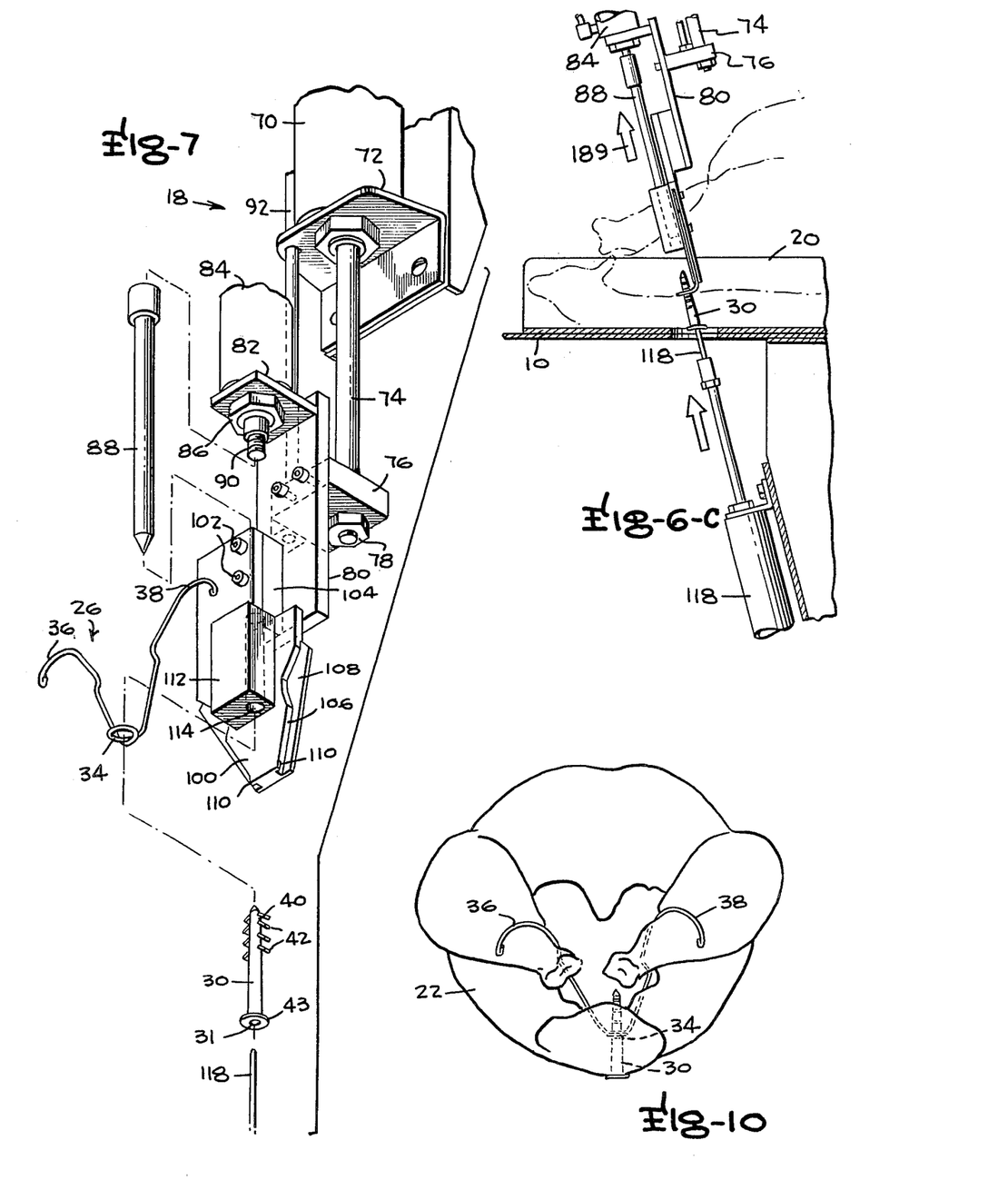
FIG. 7 is an exploded perspective view looking upwardly of portions of the preferred apparatus.
FIG. 10 is an elevation view of a fowl to which the inventive leg restraining means has been applied in practice of the invention.

The leg holding and restraining bail 26 is best illustrated in FIG. 7 and is of generally V-shaped configuration and includes a central portion consisting of a circular loop of wire 34 and first and second leg hooks 36 and 38. Leg holding and restraining bail 26 is preferably formed of wire and is dimensioned so that the leg hooks 36 and 38 can be engaged with the legs 25 of a dressed fowl with the upper end 40 of the bail anchor 30 being inserted in the circular loop 34 with canted retainer tabs 42 serving to hold the bail anchor 30 and leg holding and restraining bail 26 in connected condition as shown in FIG. 10. A radial flange 43 prevents anchor 30 from being pulled up through the fowl.

The leg holding and positioning means 14 and 16 are identical and each includes an air actuated clamp cylinder 44 to the head end of which a channel shaped hinge bracket 45 is connected with a pivot pin 46 extending through the bracket 45 and providing pivotal support on a frame mounted pivot bracket 47 as best shown in FIG. 1. Positioning springs 48 and 50 hold the clamp cylinder 44 in a floating centered position.

Cylinder rod 52 of cylinder 44 provides support for front and rear leg engaging and positioning plates 54 and 56 attached to a pivot support 57 which is pivotally supported on a carrier 58 threaded onto the lower end of rod 52. A lock nut 60 holds the carrier 58 snugly in position with a side plate 62 of the carrier providing support for a guide rod 64 extending upwardly for sliding movement in an aperture of a guide plate 66 attached to the lower end of cylinder 44. Centering springs 68 and 70 extend between carrier 58 and pivot support 57 and maintain the plates 54 and 56 in a floating centered position while the guide rod 64 acts to prevent rotation of the carrier 58, plates 54 and 56 etc. about the axis of rod 52. It should be observed that the plates 54 and 56 are generally aligned with the legs 25 of the fowl 22 so that upon extension of cylinder 44, the plates will engage the legs in a manner to be discussed in detail hereinafter.

Multi-function unit 18 includes a carrier cylinder 70 which is operated by compressed air and is mounted by a bracket 72 on the frame 12 in a position in general alignment with and above the body cavity 24 of the fowl 22. Carrier piston rod 74 extends from carrier cylinder 70 and supports a carrier block 76 held in position by nut means 78 threaded on the lower end of the rod 74. A cylinder carrier plate 80 is attached to the front face of carrier block 76 and has a protruding bracket plate 82 on which an air actuated punch cylinder 84 is mounted and held in position by a nut 86. A punch member 88 is threadably mounted on the lower end 90 of the piston rod of cylinder 84. A guide rod 92 is attached to the carrier block 76 and extends outwardly through a guide aperture provided in the bracket 72 to prevent rotation of carrier piston rod 74, block 76 etc. about the axis of rod 74.

A bail carrier 100 is connected to the front face of cylinder carrier plate 80 by machine screws 102 and a spacer block 104 with the bail carrier including an edge surface 106 contoured to permit a leg-holding and restraining bail 26 to be snapped into position thereon with a rear flange portion 108 and small front tabs 110 serving to hold the bail 26 in position as shown in FIG. 1.

A punch guide block 112 is mounted on the forward face of the bail carrier 100 and includes a bore 114 axially aligned with punch member 88 which is positioned therein for axial reciprocation upon actuation of the punch cylinder 84.

The bail anchor inserting means 32 includes an insertion cylinder 114 mounted on the framework beneath table 10 and having a piston rod 116 to the outer end of which a reduced diameter anchor support pin 118 is connected. Anchor support pin 118 is coaxially aligned with punch member 188 and matingly extends into an axial aperture 31 provided in the bail anchor 30 which is manually positioned on pin 118 as shown in FIG. 1.

Figure 11:
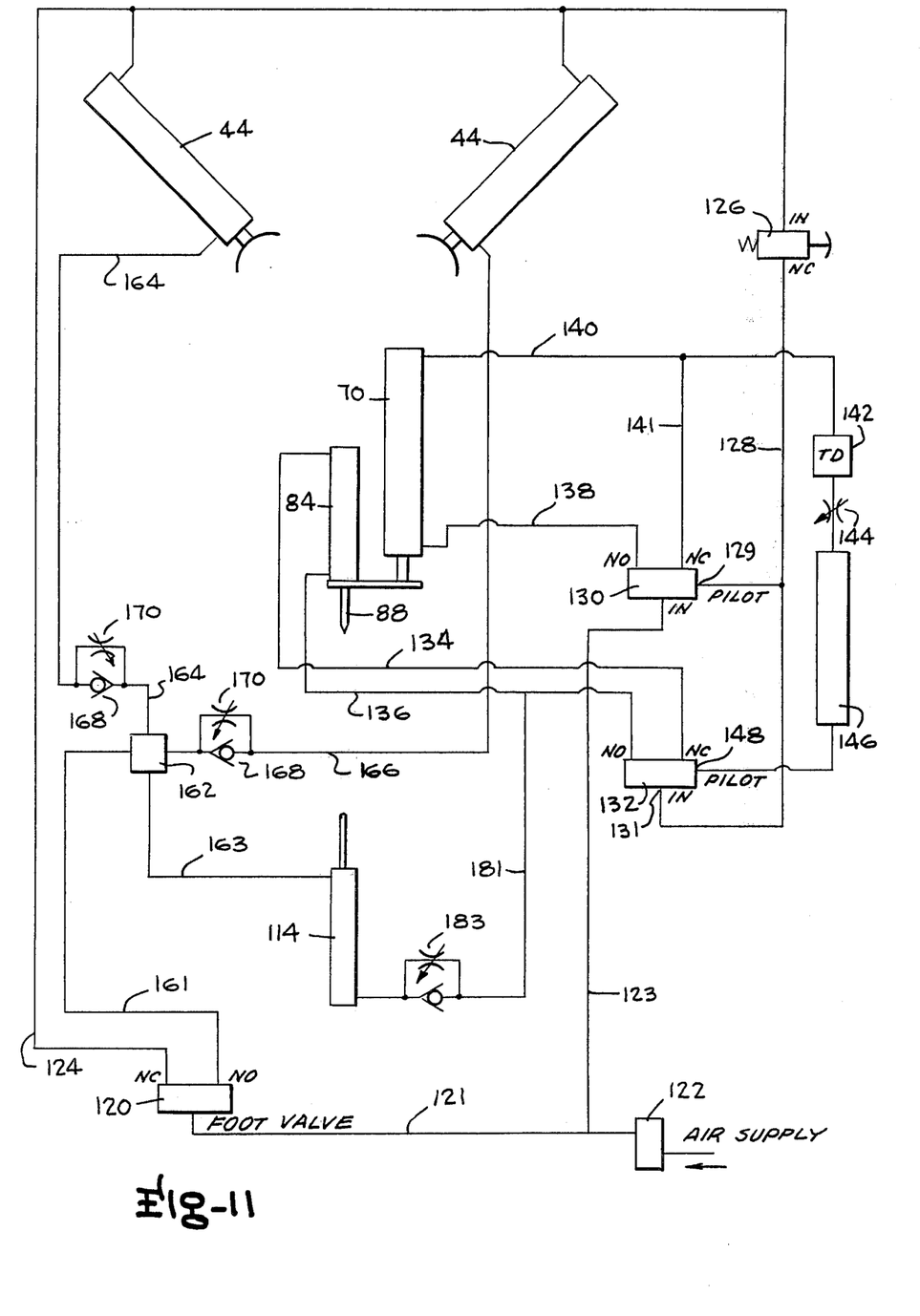
FIG. 11 is a hydraulic schematic of power actuation and control means of the preferred apparatus.

FIG. 11 illustrates pneumatic circuitry for controlling the apparatus which includes a foot valve 120 connected by a supply line 121 to a source 122 of pressurized air. A clamp actuate line 124 extends from foot valve 120 to the head ends of cylinders 44 and to a palm actuate valve 126. A pilot supply line 128 extends from the palm actuate valve 126 to the pilot port 129 of a carrier cylinder actuator pilot valve 130 and a valved inlet port 131 of a punch cylinder actuator pilot valve 132. A punch cylinder head end supply line 134 and a punch cylinder rod end supply line 136 respectively extend from the punch cylinder actuator pilot valve 132 to the head and rod ends of the punch cylinder 84. Similarly, a rod end supply line 138 extends from valve 130 to the rod end of carrier cylinder 70 while a head end supply line 140 connected to the head end of cylinder 70 is connected to a second outlet port of the valve 130 by a line 141. Line 140 is also connected to a time delay valve 142, a variable orifice valve 144 and a volume chamber 146 to a pilot port 148 of the punch cylinder actuator pilot valve 132. A line 161 is connected to the normally open port of foot valve 120 and to a fitting 162 which is connected by line 163 to the rod end of insertion cylinder 114. Fitting 162 is also connected to lines 164 and 166 each of which extends to the rod end of one of the clamp cylinders 44 and each of which includes a one-way valve 168 connected in parallel with a variable flow control valve 170.

Figures 2, 8, 9:
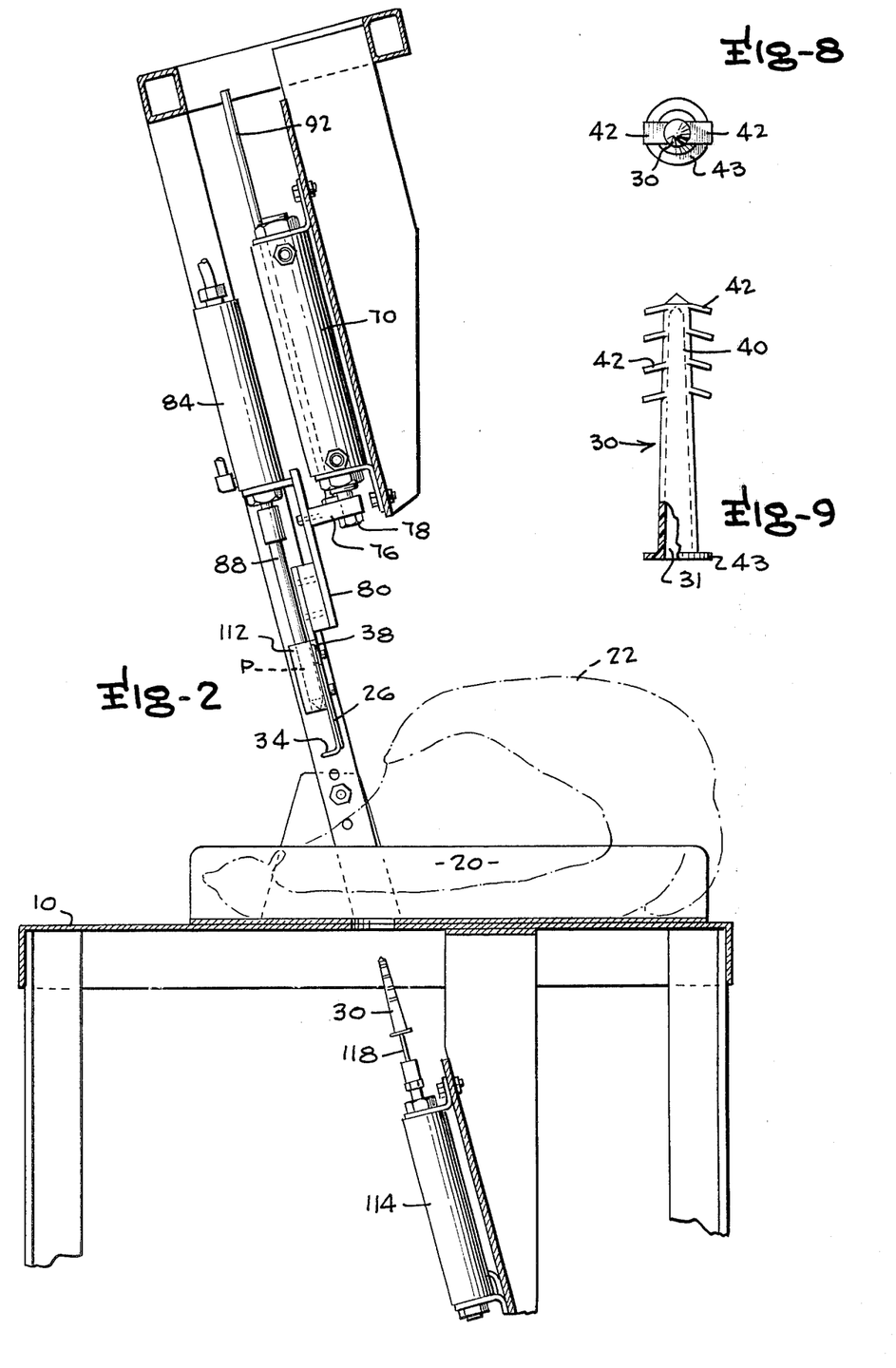
FIG. 2 is a sectional view taken along lines 2—2 of FIG. 1.
FIG. 8 is a plan view of the inventive anchor means.
FIG. 9 is a front elevation view with parts removed of the anchor means.
Figure 3:
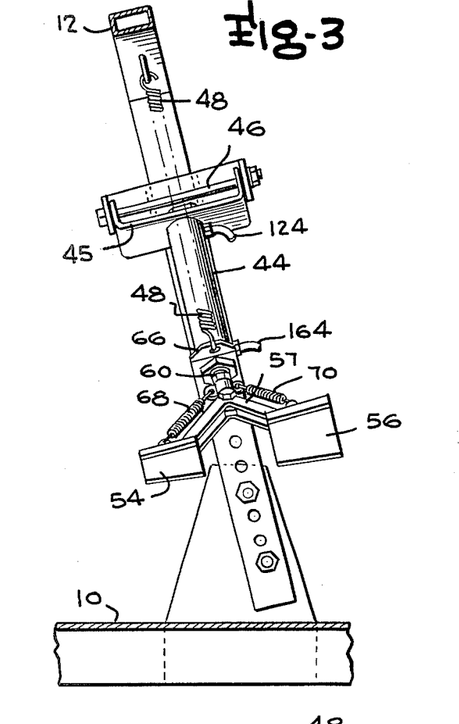
FIG. 3 is a sectional view taken along lines 3—3 of FIG. 1.
Figure 4:
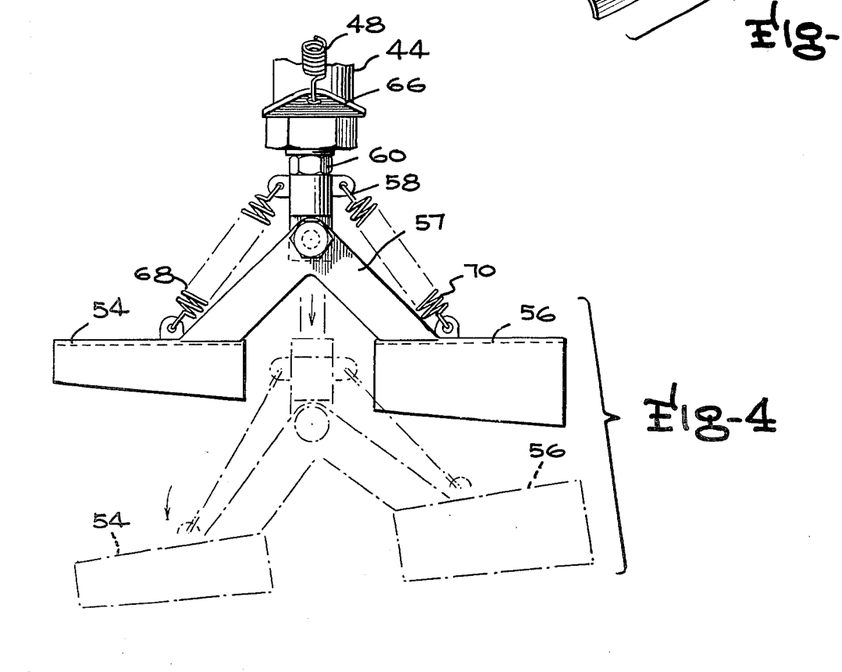
FIG. 4 is an enlarged view of a portion of FIG. 3 illustrating the parts in two different positions.
Figure 5:
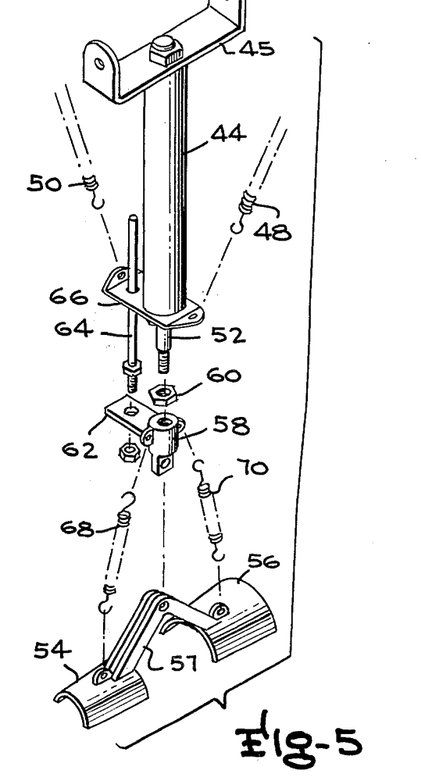
FIG. 5 is an exploded perspective view of a portion of leg positioning means of the preferred embodiment.

A cycle of operation will now be discussed with initial reference to the FIGS. 2 and 11. At the beginning of the cycle the dressed fowl 22 is positioned on cradle 20 with the other parts of the apparatus being in the position illustrated in FIG. 2. The wirelike leg holding and restraining bail 26 is positioned on the bail carrier 100 either manually or by automatic bail feed means (not shown). Similarly, the bail anchor 30 is positioned on the anchor support pin 118. The operator actuates foot valve 120 to consequently provide pressurized air to the clamp actuate line 124 to actuate cylinders 44 so that the leg engaging and positioning plates 54 engage the legs 25 of the fowl and press them downwardly with the outer ends of the fowl being moved inwardly to the body cavity and toward each other. It should be noted that the leg engaging and positioning plate 56 will normally engage the upper or thigh portion of the leg before the plate 54 engages the outer end portion of the leg. In any event, the leg ends are pressed downwardly into the body cavity in general alignment with the leg hooks 36 and 38 of the leg holding and restraining bail 26.

Palm actuate valve 126 is then opened by the operator to supply pressurized air to the line 128 and to the pilot port 129 of carrier cylinder actuator pilot valve 130. Valve 130 is consequently activated to connect line 123 to line 141 to supply pressurized air to line 140 and the head end of cylinder 70 to extend cylinder 70 downwardly from the position of FIG. 2 to the position of FIG. 6A so that the leg hooks 36 and 38 of the leg holding and restraining bail 26 are engaged with the leg ends.

Pressurized air in line 140 also flows through means 142, 144 and 146 to the pilot port 148 of valve 132 which is consequently actuated to supply pressurized air to line 134 and the head end of punch cylinder 84 to actuate same. Actuation of punch cylinder 84 occurs at a time subsequent to the completion of the stroke of carrier cylinder 70 so that at the time of actuation of punch cylinder 84 the fowl is firmly held by the plates 54, 56. Actuation of punch cylinder 84 causes the punch 88 to move downwardly from the position of FIG. 6A to the position of FIG. 6B in the direction of arrow 169 in FIG. 6B. Punch member 88 consequently passes through the back area of the fowl. It should be observed that the punch 88 moves downwardly through the center of the circular loop 34 upon actuation of cylinder 84. Cylinder 84 is then retracted by supplying pressurized air to line 136 to retract the punch 88 upwardly in the direction of arrow 189 as shown in FIG. 6C and the head end of cylinder 114 is provided with pressurized air from line 181 through a variable valve 183 to extend the cylinder 114 and move the bail anchor 30 upwardly into the aperture previously created by the punch member 88.

Bail anchor member 30 moves upwardly through the previously created opening into the closed circular loop 34 with the canted locking or retaining tabs 42 being deflected toward the radial flange 43 during the inserting operation. However, it will be appreciated that the locking tabs 42 are oriented and dimensioned so that they extend outwardly and engage the circular loop 34 to preclude withdrawal of the anchor 30 therefrom and to also preclude outward movement of the bail member under the urging of force exerted by the legs 25 against the first and second leg hooks 36 and 38. The legs are consequently held in snug fixed position in the cavity as shown in FIG. 2. The cycle is completed by contraction of cylinder 114, contraction of cylinder 70 and contraction of cylinders 44 to return the parts to the positions illustrated in FIG. 1.

It will consequently be seen that the present invention provides a new and improved leg anchoring and holding means and apparatus for quickly and securely affixing same to a dressed fowl. Numerous modifications to the preferred embodiments will undoubtedly occur to those skilled in the art and it should therefore be understood that the spirit and scope of the invention is to be limited solely by the appended claims.

I claim:

1. Leg holding and positioning apparatus for positioning in a dressed fowl comprising the combination of a wirelike bail having a central portion with first and second leg hooks extending outwardly therefrom and dimensioned to be hooked over the leg ends of a fowl with the central portion extending into the body cavity of the fowl and bail anchor means dimensioned to extend through the back of the fowl to the body cavity including connector means connectable to the central portion of the wirelike bail for holding the wirelike bail in position to restrain outward movement of the wirelike bail and the legs of the fowl legs.

2. The invention of claim 1 wherein said wirelike bail is of V-shaped configuration with said central portion being at the apex thereof.

3. The invention of claim 2 wherein said bail anchor means comprises an elongated plastic anchor member having a radial flange on an outer end engageable with the exterior of the back of the fowl for limiting the extent to which the bail anchor means can be moved into the body cavity of the fowl.

4. The invention of claim 3 wherein said connector means on said anchor member comprises a plurality of canted retainer tabs extending outwardly from said anchor member and dimensioned to engage and restrain said central portion of said wirelike bail.

5. The invention of claim 4 wherein said central portion of said wirelike bail comprises a closed loop defining an opening into which said anchor member extends.

6. The invention of claim 1 wherein said wirelike bail is of V-shaped configuration with said central portion being at the apex thereof and comprising a closed loop.

7. The invention of claim 6 wherein said bail anchor means comprises an elongated plastic anchor member having a radial flange on an outer end engageable with the exterior of the back of the fowl for limiting the extent to which the bail anchor means can be moved into the body cavity of the fowl.

8. The invention of claim 7 wherein said connector means on said anchor member comprises a plurality of canted retainer tabs extending outwardly from said anchor member and canted toward said flange and dimensioned to extend into and engage and restrain said closed loop.

9. The invention of claim 1 wherein said central portion of said wirelike bail comprises a closed loop defining an opening into which one end of said anchor means extends and wherein said anchor means comprises an elongated plastic member having an axial cavity extending inwardly from one end and having an outwardly radial flange at said one end and canted lock tabs extending outwardly at an opposite end and canted and bendable toward said radial flange to permit said lock tabs to be inserted into and through said closed loop while resisting reverse movement therefrom.

10. The invention of claim 9 wherein said wirelike bail is formed of metal and is of V-shaped configuration.

11. Apparatus for applying leg restaining tie-down means to a fowl comprising:
    (a) fowl support means for supporting a dressed fowl on its back;
    (b) leg positioning means positioned above the fowl support means for moving the legs of a fowl positioned on the support means inwardly to a tucked position adjacent the body cavity;
    (c) bail positioning means for positioning a wirelike bail having a central portion and first and second leg hooks in a holding position in which the first and second leg hooks engage the legs of the fowl and the central portion is in the body cavity of the fowl; and
    (d) anchor inserting means for moving an elongated anchor member up through the back of the fowl to connectingly engage holding means on one end of the elongated anchor member with the central portion of the wirelike bail to preclude subsequent outward movement of the wirelike bail.

12. The apparatus of claim 11 additionally including power actuated punch means aligned with said anchor inserting means for punching an anchor receiving openng through the back of the fowl prior to actuation of said anchor inserting means.

13. The apparatus of claim 12 wherein said leg positioning means positioned above the fowl support means includes first and second pneumatically actuated clamp cylinders each having first and second leg engaging and positioning plates movable downwardly into contact with a fowl for pushing the legs of the fowl downwardly into snug position in the body cavity of the fowl.

14. The apparatus of claim 13 wherein said bail positioning means includes a carrier cylinder positioned vertically above the fowl and having its rod end facing downwardly, a bail carrier mounted on the outer end of the piston rod of the carrier cylinder and including a surface on which an individual wirelike bail can be snapped into position so that upon actuation of the carrier cylinder the wire bail is moved downwardly to engage first and second leg hooks on opposite sides of the bail with the legs of the fowl which are tucked in the body cavity thereon.

15. The apparatus of claim 14 wherein said power actuated punch means comprises a punch cylinder, means connecting said punch cylinder to the outer end of the piston rod of the carrier cylinder so that said punch cylinder is carried for vertical movement by the piston rod of the carrier cylinder and punchmeans mounted on the end of the piston rod of the punch cylinder.

16. The apparatus of claim 15 wherein said anchor inserting means comprises an insertion cylinder positioned beneath said fowl support means in axial alignment with said punch cylinder and including an anchor support pin mounted on the outer end of the piston rod of the insertion cylinder for matingly receiving a plastic anchor member thereon so that upon actuation of said insertion cylinder the plastic anchor means is drivingly inserted outwardly through the area of the fowl through which said punch means has previously passed.

17. The apparatus of claim 12 wherein said power actuated punch means comprises a punch cylinder, means connecting said punch cylinder to the outer end of the piston rod of the carrier cylinder so that said punch cylinder is carried for vertical movement by the piston rod of the carrier cylinder and punch means mounted on the end of the piston rod of the punch cylinder.

18. The apparatus of claim 17 wherein said anchor inserting means comprises a insertion cylinder positioned beneath said fowl support means in axial alignment with said punch cylinder and including an anchor support pin mounted on the outer end of the piston rod of the insertion cylinder for matingly receiving a plastic anchor member thereon so that upon actuation of said insertion cylinder the plastic anchor means is drivingly inserted outwardly through the area of the fowl through which said punch mean has previously passed.

* * * * *